May 27, 1930.  F. BANDHAUER  1,760,034
PENDULUM WEIGHER
Filed Dec. 30, 1927  2 Sheets-Sheet 2

Inventor
Franz Bandhauer
By B. Singer, atty.

Patented May 27, 1930

1,760,034

UNITED STATES PATENT OFFICE

FRANZ BANDHAUER, OF VIENNA, AUSTRIA, ASSIGNOR TO THE FIRM S. ROTHMÜLLER A. G., OF VIENNA, AUSTRIA

PENDULUM WEIGHER

Application filed December 30, 1927, Serial No. 243,753, and in Austria January 19, 1927.

Pendulum weigher with independently turnable knife edge pillows of the pendulum weight.

The present invention relates to a pendulum weigher in which the load of the platform acts on two members, which operate independently of each other in such manner that only one of said members actuate the pendulum weight of the weigher, said weight being connected to the indicating apparatus, whereas the other element turns the knife edge pillow of the pendulum weight, said pillow being influenced by a particular equilibrating power.

With a weighter of such kind a portion of the tension due to the platform load is used to turn the rotatably journalled pillow nearly by the same angular amount as the knife edge is turned by the load, so that the relative movement of the knife edges in the pillows is exceedingly small. Thereby it is possible to increase the angle of deflection of the pendulum weight to more than the double in comparison with the weighers having the usual fixed knife edge bearings, the sensibility being as high as possible.

The relative movement of the knife edge in its pillows being very small, such knife edge is loaded nearly only by pressure, and the friction caused by the movement of the knife edge in the pillows, said friction being otherwise rather large is compensated nearly completely. From this reason the sensibility and the durability of a weigher of such kind are materially larger than those of a pendulum weigher of usual kind.

In the accompanying drawings

Figure 1:
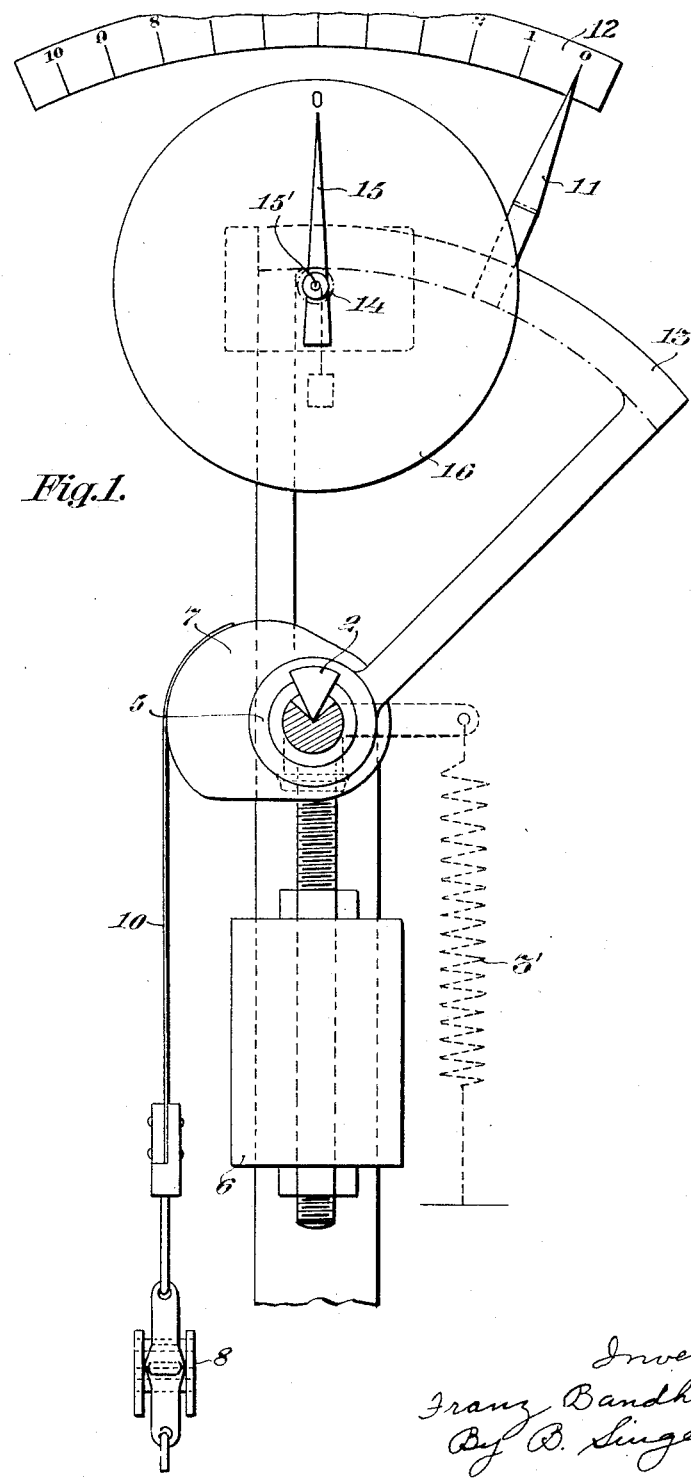
Figure 1 is a front elevation of a pendulum weigher constructed and arranged in accordance with this invention.

The weigher comprises a shaft 1, which is journalled at both ends in bearings by preference in ball bearings and has fixed thereto the pillows for the knife edges of the scale beam shaft 2. The center of the shaft 1 coincides with the edge of the knife of the shaft 2. The shaft 1 is provided itself with a segment 4 and a pendulum weight 3, which has for its purpose to equilibrate the portion of the platform load acting on the band 9 passing over the segment 4. In the knife edge bearings provided on the shaft 1 the beam 5 is journalled by means of the knife edge being represented in the drawing also by 2, in such manner that such beam 5 may freely oscillate. It forms the very scale beam and carries a segment 7 and a pendulum weight 6. The action of the platform load is transmitted by the lever 8 to the band 9 and the band 10 passing over the segment 7 and causes the pendulum weights 3 and 6 to deviate. Such weights are measured so that each of them equilibrates the pull due to its respective component of the platform load and both weights 3 and 6 have the same angle of deviation neglecting the friction, which, of course, is larger with the shaft 1 than with the shaft of the beam 5.

The beam 5 is connected to a toothed segment 13 which carries a pointer 11. Said pointer moves along a segmental scale 12 and indicates the units of weight of higher order. The teeth of the segment 13 mesh with the pinion 14 on a shaft 15' which carries one or more pointers 15 which move over a dial 16 and coact therewith to indicate the units of lower order.

The transmission of the deviation to the indicating element of the weigher takes place only from the beam 5, whereas the load component distributed to the shaft 1 has only the purpose to effect a synchronous movement of the knife edge pillows and the beam and thereby minimize the relative movement between the beam shaft and its pillows or between the pillows and the corresponding knife edges.

Figure 2:
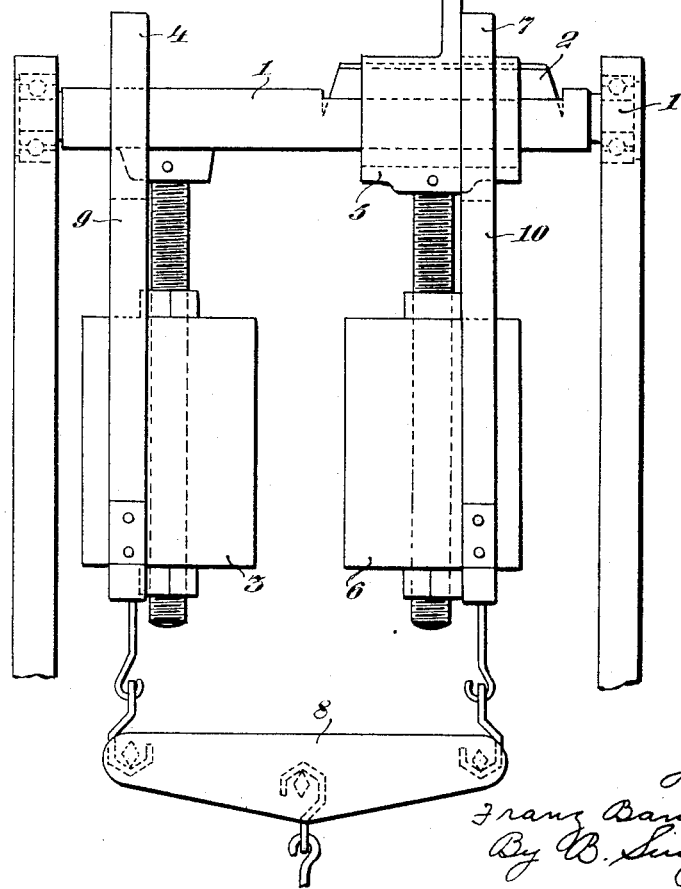
Figure 2 is a side elevation of the same.

For equilibrating the load component acting on the band 9 and segment 4 and causing the pillows to move along with the knife edges a correspondingly measured spring or the like may be used instead of the pendulum weight 3. Such spring 3' may be connected to an arm of the shaft 1, as shown by dotted lines in Fig. 2.

What I claim is:

1. In a weigher the combination of a scale beam, knife edges on said beam and movable pillows for movably supporting said beam and means for moving said pillows substantially in synchronism and in the same direction with the knife edges.

2. In a weigher the combination of a scale beam having knife edges, an equilibrating member, independently turnable pillows for such knife edges, said pillows being connected to said equilibrating member, a platform for placing a load thereon, two elements acted upon by the loaded platform, a load indicating device, a second equilibrating member, connected to said indicating device, only one of said elements acting on said second equilibrating member, the other element causing said pillows to move in synchronism and in the same direction with the knife edges.

In witness whereof I affix my signature.

FRANZ BANDHAUER.